US010228261B2

(12) United States Patent
Cavanaugh et al.

(10) Patent No.: US 10,228,261 B2
(45) Date of Patent: *Mar. 12, 2019

(54) INTERACTIVE VOICE RESPONSE WITH USER DESIGNATED DELIVERY

(71) Applicant: AT&T INTELLECTUAL PROPERTY I, L.P., Atlanta, GA (US)

(72) Inventors: Craig M. Cavanaugh, Atlanta, GA (US); John P. Ruckart, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/837,404

(22) Filed: Aug. 27, 2015

(65) Prior Publication Data
US 2015/0369624 A1 Dec. 24, 2015

Related U.S. Application Data

(63) Continuation of application No. 11/745,114, filed on May 7, 2007, now Pat. No. 9,191,514.

(51) Int. Cl.
| *H04M 11/00* | (2006.01) |
| *G01C 21/36* | (2006.01) |
| *H04M 3/533* | (2006.01) |
| *H04W 4/02* | (2018.01) |
| *H04M 3/493* | (2006.01) |
| *G01C 21/34* | (2006.01) |
| *H04W 88/02* | (2009.01) |

(52) U.S. Cl.
CPC ..... *G01C 21/3608* (2013.01); *G01C 21/3626* (2013.01); *H04M 3/493* (2013.01); *H04M 3/53325* (2013.01); *H04W 4/02* (2013.01); *G01C 21/34* (2013.01); *H04W 88/02* (2013.01)

(58) Field of Classification Search
CPC ... G01C 21/34; G01C 21/362; G01C 21/3632
USPC .......................................... 379/88.01–88.19
See application file for complete search history.

(56) References Cited

U.S. PATENT DOCUMENTS

| 6,292,480 B1* | 9/2001 | May .................. H04L 29/06 370/352 |
| 6,539,080 B1 | 3/2003 | Bruce et al. |
| 6,792,082 B1 | 9/2004 | Levine |
| 2001/0041562 A1* | 11/2001 | Elsey ................ H04M 3/493 455/414.3 |
| 2002/0164004 A1 | 11/2002 | Tamura et al. |
| 2003/0050075 A1* | 3/2003 | Rangarajan ............ G01C 21/20 455/456.1 |

(Continued)

*Primary Examiner* — Solomon G Bezuayehu
(74) *Attorney, Agent, or Firm* — Greenblum & Bernstein, P.L.C.

(57) ABSTRACT

Directions are provided over a network to a mobile terminal. Destination entries are stored in a memory. A server receives a voice-based request for directions to a target destination from the mobile terminal. A current location of the mobile terminal is determined. A processor compares the destination entries with the target destination to determine a matching entry. Directional instructions to the matching entry are obtained for the target destination based on the current location of the mobile terminal. The obtained directional instructions are transmitted to the mobile terminal for display on the mobile terminal.

20 Claims, 5 Drawing Sheets

(56) References Cited

U.S. PATENT DOCUMENTS

| | | | |
|---|---|---|---|
| 2004/0083050 A1* | 4/2004 | Biyani | G01C 21/34 |
| | | | 701/532 |
| 2005/0049785 A1 | 3/2005 | Vergin | |
| 2006/0025070 A1 | 2/2006 | Kim et al. | |
| 2006/0031009 A1* | 2/2006 | Brulle-Drews | G01C 21/3629 |
| | | | 701/428 |
| 2006/0073815 A1* | 4/2006 | Pines | B60R 16/0207 |
| | | | 455/414.1 |
| 2006/0126820 A1 | 6/2006 | Trandal et al. | |
| 2008/0019496 A1* | 1/2008 | Taschereau | G06F 17/3087 |
| | | | 379/218.01 |
| 2008/0312828 A1 | 12/2008 | Marsalka et al. | |
| 2010/0278317 A1 | 11/2010 | Broman et al. | |
| 2011/0004403 A1 | 1/2011 | Odinak et al. | |
| 2011/0164279 A1 | 7/2011 | Wang et al. | |
| 2012/0263281 A1 | 10/2012 | Gandhi et al. | |
| 2013/0275132 A1 | 10/2013 | Bangalore et al. | |
| 2014/0213224 A1 | 7/2014 | Woodring | |

* cited by examiner

INTERACTIVE VOICE RESPONSE WITH USER DESIGNATED DELIVERY

CROSS-REFERENCE RELATED APPLICATIONS

The present application is a continuation of U.S. application Ser. No. 11/745,114, filed May 7, 2007, the disclosure of which incorporated herein by reference in its entirety.

FIELD OF THE DISCLOSURE

The present disclosure relates to interactive voice response systems and more specifically to interactive voice response methods and systems with a user designated delivery method.

BACKGROUND

Voice activated information services which are accessed by phone are increasing in popularity. Customers can now call a number to reach an interactive voice response (IVR) system and be provided information such as account information, technical help, billing and store locations. For example, a user calls a phone number and identifies a destination such as a restaurant or store. The location service then provides the user with the name, address and directions to the destination.

One issue with current voice activated information services is that the information is provided verbally by an IVR system. The user must either remember the information or write it down. This can be difficult when the user is presented with several pieces of information, the information is long and complex and/or the user is engaged in an activity such as driving a car.

SUMMARY

This summary is provided to introduce simplified concepts of providing voice activated location information to a user via a designated delivery method, which are further described below in the Detailed Description. This summary is not intended to identify essential features of the claimed subject matter, nor is it intended to limit the scope of the claimed subject matter.

In one aspect, a user via a wireless communications device requests directions to a desired destination and specifies a delivery method for the directions. The user's location is then determined by one of several different methods including the Mobile Identification Number of the user's cell phone, by cellular site triangulation, by the user imputing his location information or by way of the users global positioning system (GPS) coordinates. A database is then queried to determine the one or more entries that match the destination contained in the user's request. Finally directional instructions to the one or more matching entries are determined and provided to the user via the specified delivery method.

In another aspect, a system for providing directions to a user comprising an interface configured to receive from the user a request for directions to a desired destination and a delivery method for the directions. A location component configured to determine the users location. A memory component configured to store a plurality of destination entries. A search component configured to compare the plurality of destination entries with the desired destination to determine one or more matching entries. A location component configured to determine directional instructions from the user's location to the one or more matching entries and an output device configured to provide the user with the directional instructions to at least one or more matching entries by the designated delivery method.

Other systems, methods, and/or computer program products according to embodiments will be or become apparent to one with skill in the art upon review of the following drawings and detained description. It is intended that all such additional systems, methods, and/or computer products be included within this description, be within the scope of the present invention, and be protected by the accompanying claims.

BRIEF DESCRIPTION OF THE DRAWINGS

The teachings herein are described with reference to the accompanying figures. In the figures, the left-most reference number digit(s) identifies the figure in which the reference number first appears. The use of the same reference numbers in different figures indicates similar or identical items.

DETAILED DESCRIPTION

As mentioned above, one problem with existing voice activated information services is that the information is provided verbally, which requires the user to either remember the address or write it down. This can be difficult when the user is presented with several different destinations, the directions are long and complex and/or the user is engaged in an activity such as driving a car. In view of these problems, an interactive voice response system is described that provides information to a user in a designated delivery format. Exemplary implementations are described in the context of voice activated delivery of location information. However, the concepts described herein are applicable to voice activated delivery of other types of information (e.g., account information, billing information, instructions to perform a task, or any other deliverable information) in a designated delivery format (e.g., email, text message, instant message, facsimile, or any other suitable information delivery format).

Figure 1:
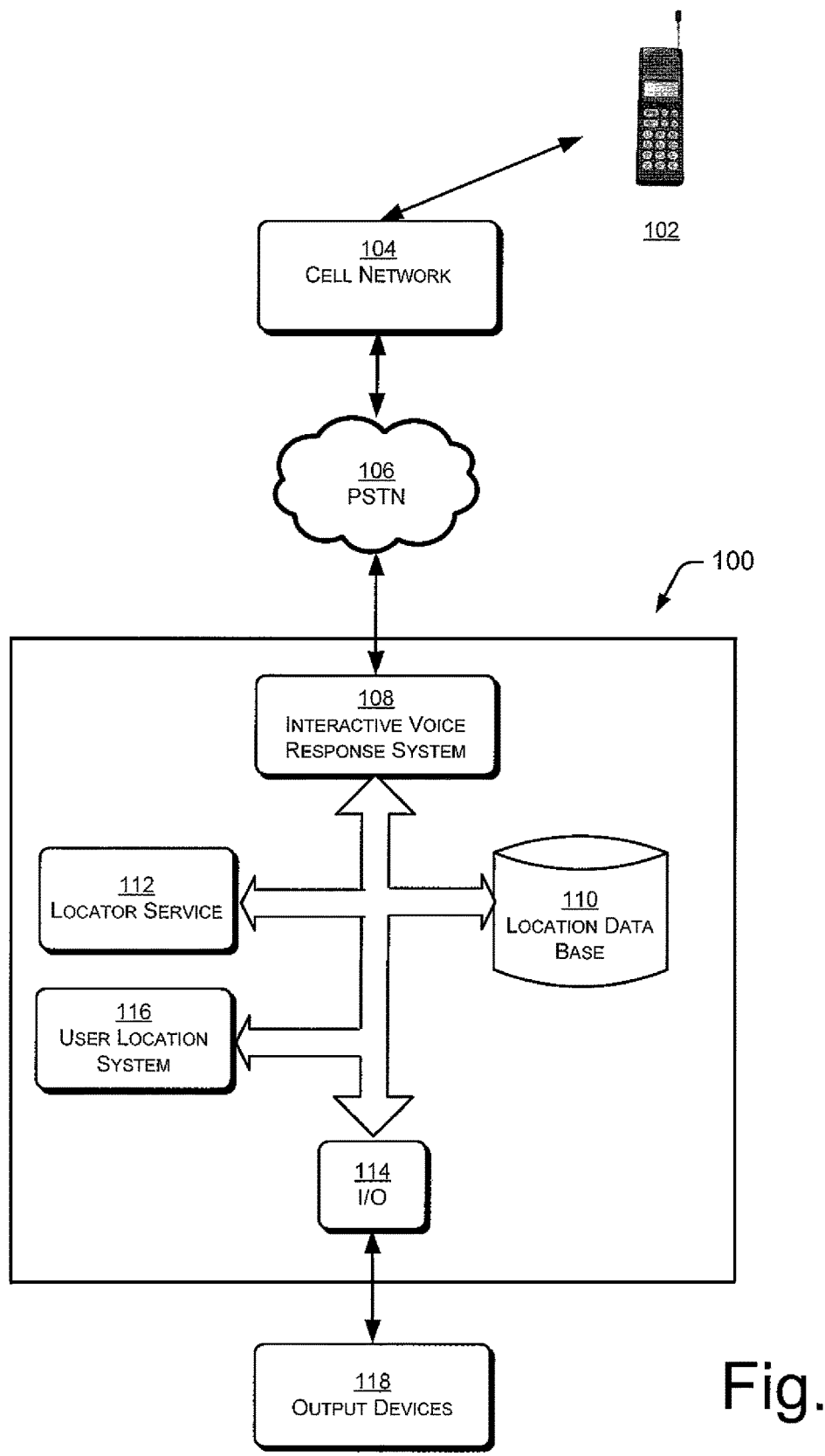
FIG. 1 is a block diagram of a system for providing voice activated information to a user via a designated delivery method in accordance with an embodiment.

FIG. 1 illustrates a location system 100 for providing voice activated destination information to a user in accordance with an embodiment of the invention. In this embodiment, the location system 100 includes a communications device 102, which may be a wireless communications device such as, but not limited to, a cell phone, a personal digital assistant (PDA), a smart phone, or any other suitable communications device. In an alternate embodiment, the communications device 102 may be a non-wireless communications device, such as, but not limited to, a land-based telephone line device, a fiber-optic system, a cable-based system, a combination of these, or any other suitable non-wireless communication device. As shown in FIG. 1, the communications device 102 transmits either "data" or "voice" over a cellular service provider network 104, to a public switched telephone network (PSTN) 106, and then to an interactive voice response system (IVRS) 108.

According to an exemplary embodiment, the interactive voice response system 108 is in communication with a location database 110 that provides the location of user-specified destinations, a location system 116 which determines the user's location, a locator service 112 that provides directions to a specified location, and an input/output device 114 which outputs the directions to an output device 118 or other suitable location specified by the user.

The interactive voice response system 108 may receive requests for directions, obtain the location of the user and provide the requested directions to the location specified by the user. Although shown as a separate component, the interactive voice response system 108 could be part of another system, such as the wireless network 104, the public switched telephone network 106, a computer network (not shown), or any other suitable network.

Figure 2:
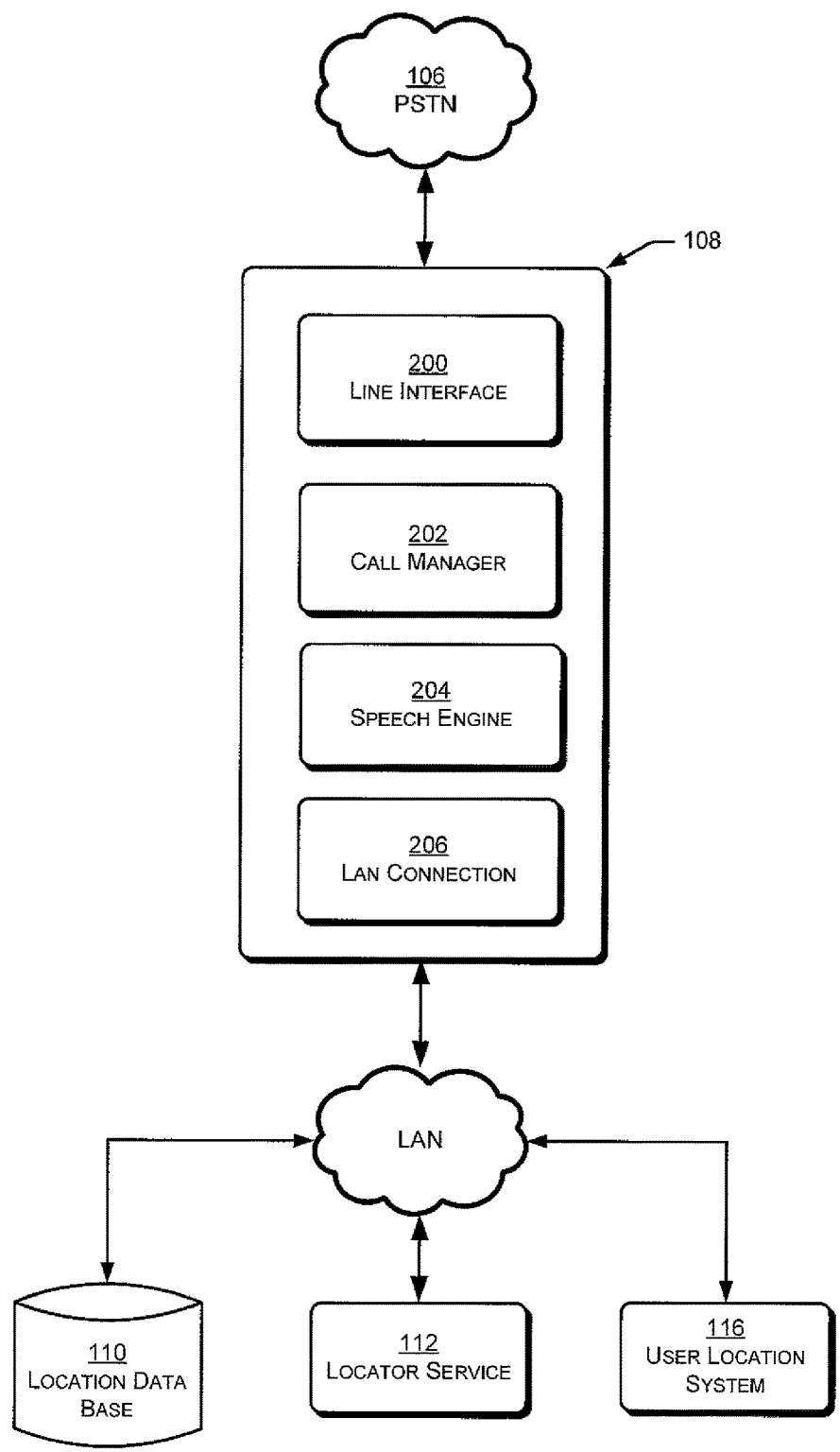
FIG. 2 is a block diagram of a speech server, suitable for providing voice activated information to a user via a designated delivery method in accordance with another embodiment.

FIG. 2 illustrates a representative embodiment of the interactive voice response system 108 of FIG. 1. In this embodiment, the interactive voice response system 108 includes a peripheral component interface (PCI) chassis housing a microprocessor and the various components described more fully below.

The location database 110 is connected to the interactive voice response system 108 via a local area network (LAN) or internet connection, according to exemplary embodiments. The location database 110 may contain location information for the destinations selected by the user. In one embodiment, location information associated with stores, restaurants, theaters, residences, hospitals and other places of interest is stored in the location database 110 (e.g. street address, global positioning system (GPS) coordinates, map coordinates, phone number, etc.)

The locator service 112 is also connected to the interactive voice response system 108 by way of a connection, such as an internet connection using TCP/IP protocols or other network protocols. The locator service 112 may provide directional instructions associated with the location directions selected by the user. In one embodiment, the locator service 112 is a third party vendor of location services, such as MapQuest® or Yahoo Maps®.

Lastly, the user location system 116 is connected to the IVRS 108 through a connection, such as a LAN or internet connection. The user location system 116 may provide the user's current location through a network-based location system (e.g., triangulation), a global positioning system (GPS) within the mobile communications device 102 or a location input by the user.

Details will now be provided regarding the interactive voice response system 108. In the embodiment shown in FIG. 2, the interactive voice response system 108 includes a line interface 200, a call manager 202, a speech recognition engine 204 and a local area network connection 206. The line interface 200 may provide an interface between the interactive voice response system 108 and the pubic switched telephone network (PSTN) 106. The call manager 202 manages the incoming calls and outgoing responses, according to exemplary embodiments. The speech recognition engine 204 may provide an interface between the interactive voice response system 108 and the communication devices 102. Finally, the LAN connection 206 provides an interface between the voice response system 108 and the other components connected to the LAN, such as the location database 110, the locator service 112 and user location system 116 according to exemplary embodiments.

Figure 3:
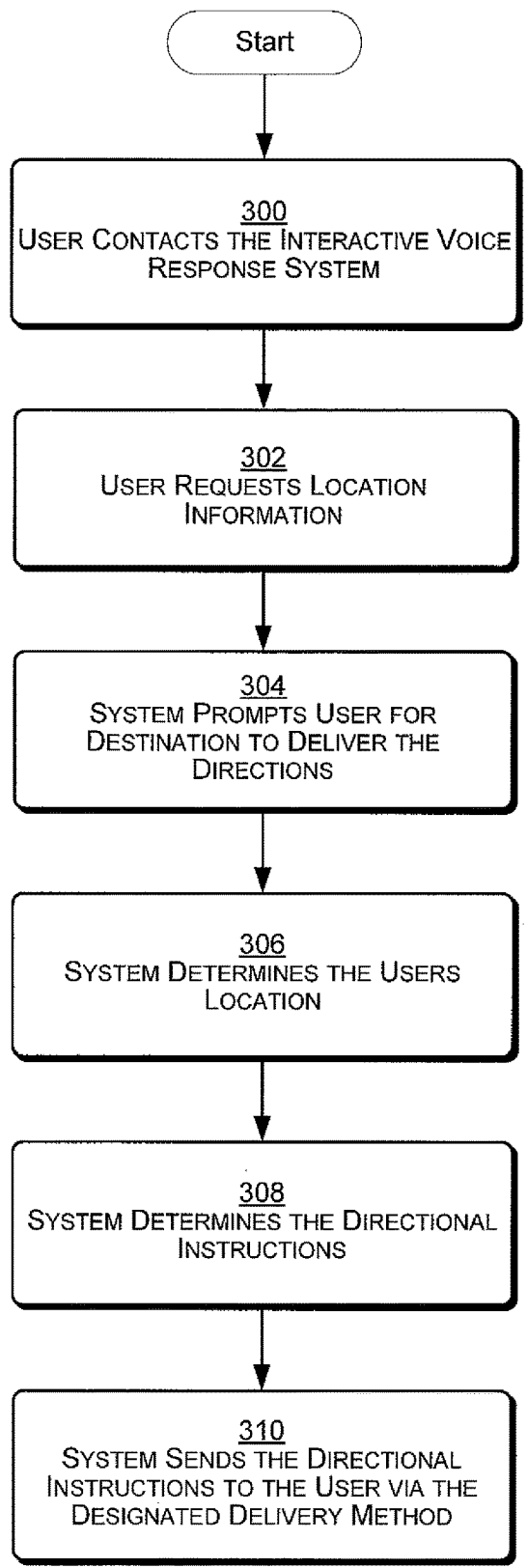
FIG. 3 is a block diagram of a method of providing voice activated information to a user via a designated delivery method in accordance with yet another embodiment.

Operation of the location system 100 will be described with reference to FIG. 3. Operation begins when the user places a call to the interactive voice response system 108 using a communications device 102, at a block 300. The number can be input manually or the number may be stored in a memory and selected by the user (e.g., from a menu). In one embodiment, the call is transmitted by the cell network 104, to the public switched telephone network (PSTN) 106, to the line interface card 200 of the interactive voice response system 108.

Once the call is established, the call manager 202 initiates a series of voice prompts to determine the user's desired destination at a block 302. The voice prompts could be prerecorded messages that are accessed and served by the call manager 202, or the prompts could be a text message that is converted to speech through a text to speech engine. The user responds to the voice prompts with his location destination or selection criteria.

At a block 304, the call manager 202 then prompts the user for a delivery destination to deliver the directions. The delivery destination selected by the user may include the user's FAX machine number, the user's E-mail address, the URL for the user's personal computer, the user's phone number to send a text message, or other suitable destination. To ensure that the user is authorized to deliver the directions to the designated destination, the call manager may prompt the user for an access code, personal identification number (PIN), pass word or other form of access information.

Alternatively, the call interactive voice response system 108 may employ voice dialing to allow the user to speak the name of the destination location instead of entering or speaking the destination's location (e.g., Email address, FAX number, mobile phone number, etc. . . . ). For example, when the user says "send to my Email" the IVRS 108 would route the directions to the users Email address without the user specifying the address.

In one embodiment, the response is passed by the call manager 202 to the speech engine 204 where the response is converted into text or other suitable digitized (or electronic) signal and compared with potential destinations. The call manager 202 then sends a Common Object Module (COM) call to the location database 110 with the desired location destination. The location database 110 is queried for all entries matching the desired location destination. Location information associated with the entries matching the desired location destination, such as a business name, address, phone number, or any other suitable information associated with the location destination, is retrieved.

The interactive voice response system 108 then queries the location system 116 for the user's current location at a block 306. The user's location can be determined using various technologies including a Wireless Access Protocol (WAP) location service, a Time Difference of Arrival (TDOA) location system, an Angle of Arrival (AOA) location system, or other suitable location technologies or techniques. In an alternate embodiment, the user provides his location to the interactive voice response system 108 through the communications device 102. The user may provide his location through a key pad, a touch screen, a pull down menu, or other suitable means of inputting data.

The location system 116 provides the interactive voice response system 108 with the user's current location. The user's location could be in a number of different formats including GPS coordinates, map coordinates, a street address, zip code or other suitable location format.

To determine the directions to the desired location destination, the interactive voice response system 108 may forward the address of the location destination and the user's location to the locator service 112. If the location data base 110 finds that multiple entries match the desired location destination, the interactive voice response system 108 may forward the address of each of the matching entries along with the user's location to the locator service 112. The addresses and the user's location may be sent via the internet or other suitable networks to a provider of location services, e.g., MapQuest® or Google Maps®. The locator service 112 using the addresses of the matching entries and the user's location determines the directions to each of the matching entries. At block 308, the locator service 112 provides the interactive voice response system 108 with the directions to the matching entries and, in an exemplary embodiment, the distance and time to reach each of the matching entries. In one embodiment, the directions are provided in rank order, with the directions of the closest matching entry provided first. In an alternate embodiment, the locator service 112 only provides directions to the matching entry closest to the user.

At a block 310, the IVRS 108 provides the directions to the input/output device 114 which transmits the directions by the method specified by the user to the output device 118 associated with the delivery destination specified by the user. For example, the directions could be sent to the user's FAX machine 118 via a telephone number provided by the user. The directions could also be sent via the internet, either by E-mail to the users email address or by direct transfer to an IP address corresponding to the user's personal computer 118. Alternatively, the directions could be sent to the user's wireless communications device 102, such as via instant messaging 118.

Figure 4A:
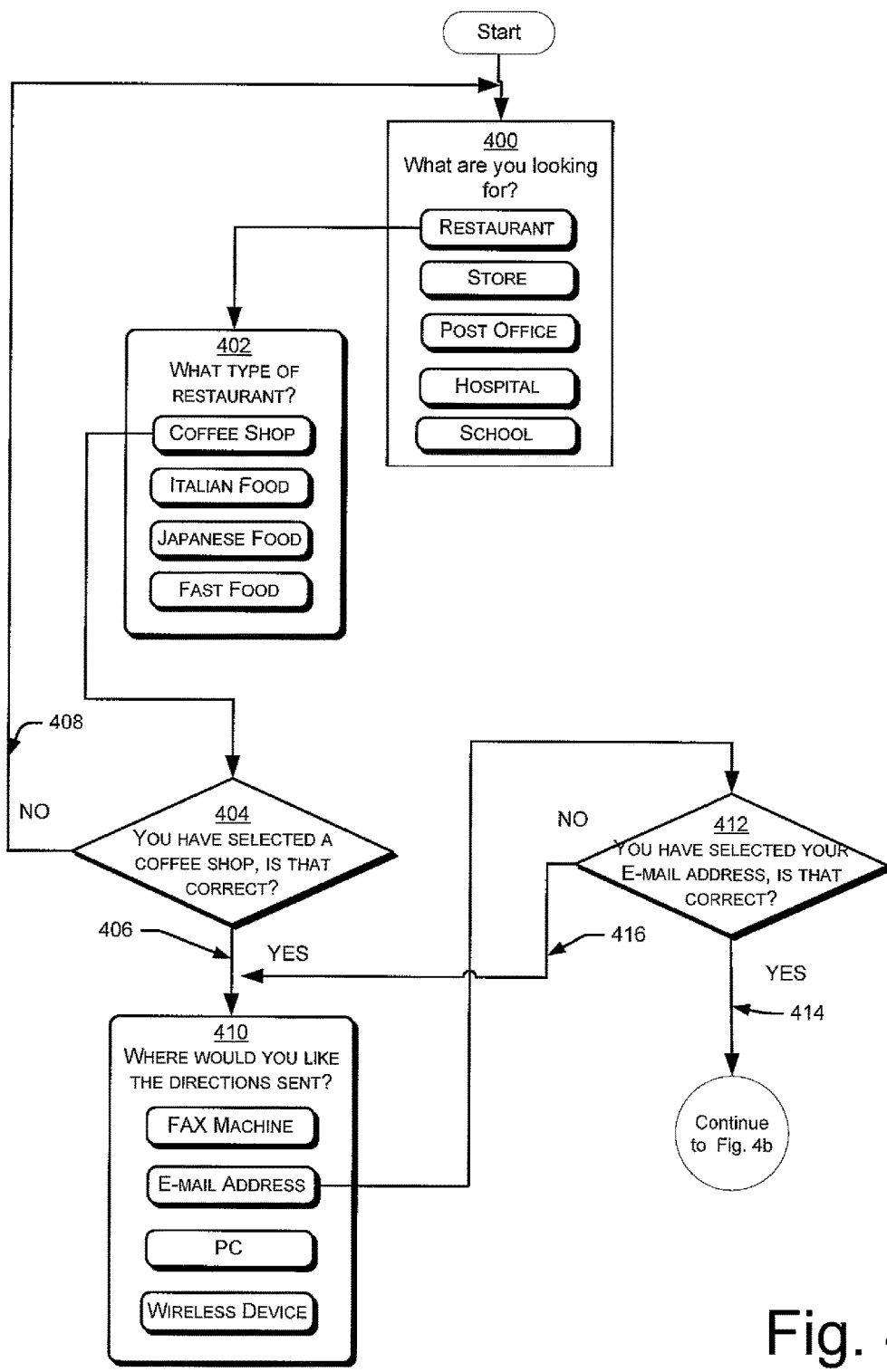
FIGS. 4*a* and 4*b* are block diagrams illustrating operation of the system of FIG. 1 in accordance with a further embodiment.

FIG. 4 illustrates a method of using the interactive voice response system 108 for providing location information in accordance with one embodiment of the invention. With reference to FIG. 4, assume that the user wants a cup of coffee and is not familiar with the area. Using a cell phone, the user dials the number to access the location system 100. At a block 400, the interactive voice response system 108 prompts the user "What are you looking for?" and provides a menu of choices (e.g., restaurant, store, post office, school, hospital, etc.). The user responds to the prompt with the destination desired, in this case a restaurant. The speech engine 204 converts the user's response into text format and compares the converted response to acceptable responses.

If the user's response is acceptable, the call manager 202 then asks the user "What type of restaurant?" and provides a menu of choices (e.g., coffee shop, fast food, Chinese food, Italian food, etc.) at a block 402. The speech engine 204 again converts the user's response into text format and compares the converted response to acceptable responses.

At a block 404, the call manager 202 then asks the user to verify his selection by asking "You have selected a coffee shop, is that correct?" If the user responds affirmatively (path 406), the call manager 202 asks the user "Where would you like the directions sent?" and provides a menu of options (i.e., FAX machine, E-mail address, personal computer, wireless device, etc.) at a block 410. The list of delivery options may be established by the user ahead of time, may be automatically established based on the user's subscription with a service provider, or may be some combination of these approaches. The speech engine 204 again converts the user's response into text format and compares the converted response to acceptable responses. If, at block 404, the user responds negatively, the call manager 202 returns the user to the first prompt 400 along path 408. According to exemplary embodiments, the user may respond to the prompt of block 400 with a specific location destination, such as Starbucks®. If a specific location destination is received, the method may skip block 402 and proceed directly to block 404, where the call manager 202 prompts the user to verify the selection.

After receiving the user's delivery instructions at block 410, the call manager 202 then asks the user to verify his selection by asking "You have selected your E-mail address, is that correct?" at a block 412. If the user responds affirmatively (path 414), the system continues to the actions shown in FIG. 4b. Alternatively, if the user responds negatively, the call manager 202 returns the user to the prompt at block 410 along path 416.

Figure 4B:
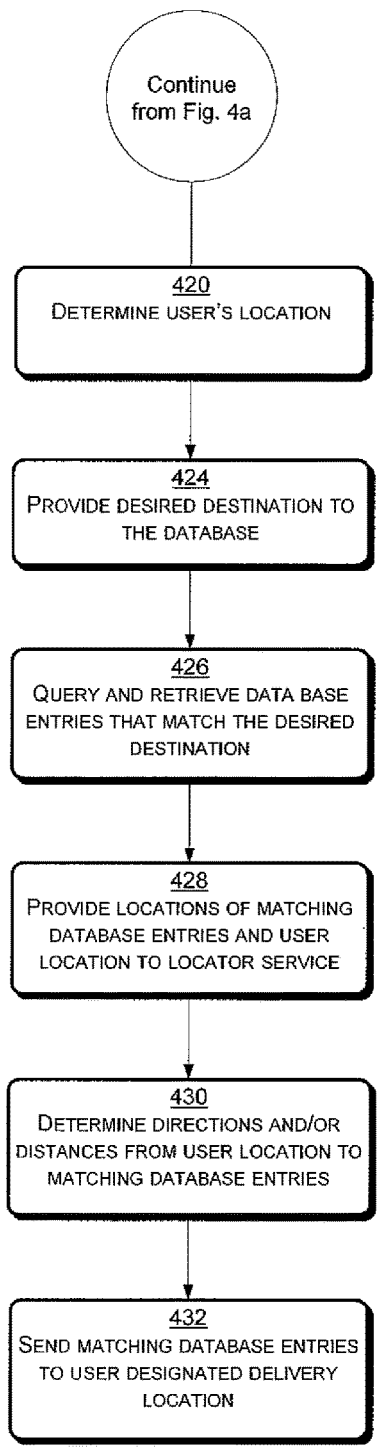

As shown in FIG. 4b, the system determines the user's current location at a block 420. In one embodiment, the call manager 202 prompts the user for his location. The user could respond by inputting his GPS coordinates, map coordinates, a street address, a zip code, or other suitable forms of location information. Alternatively, the user's current location may be determined automatically, e.g., by triangulation, GPS location, or any other suitable location determination technique.

At block 424 the interactive voice response system 108 provides the destination "coffee shop" to the location database 110 (see FIG. 2). The location database 110 is queried at a block 426 to determine the entries that match "coffee shop" or the user's specific location destination and to retrieve the name, street address, geographic location, etc. for the entries that match.

To determine which coffee shop is closest to the user, the interactive voice response system 108 transmits the user's location, along with the locations of each of the matching entries from the location database 110, to the locator service 112 at a block 428. In one embodiment, the request may be sent across the internet to a third party locator service such as MapQuest® or Google Maps®. The locator service 112 determines the directions to each matching entry, such as each coffee shop, from the user's current location at a block 430, and provides the information to the interactive voice response system 108. The information could be returned in a number of different formats including listing the closest coffee shops first and the farthest coffee shops last, for example.

At a block 432, the directions to the coffee shops are then sent by the interactive voice response system 108 to the input/output device 118 which sends the directions to the closest coffee shop to the users E-mail address. The directions could be sent in a number of different formats including text (e.g., English, Spanish, etc.), a graphical representation (e.g., map, line drawing, etc.) or a mixture of graphics and text.

Generally, any of the functions described can be implemented using software, firmware (e.g., fixed logic circuitry), hardware or any combination of these. In the case of software, the module or functionality described may be executed on processor(s) (e.g., microprocessors, controllers, and the like). Moreover, the software can be stored in one or more computer-readable memory devices. Furthermore, the features and aspects described herein are platform-independent such that the techniques may be implemented by a variety of commercial computing platforms employing a variety of processors.

It will also be appreciated that methods and systems of the present disclosure may be described as computer-executable instructions. Generally, computer executable instructions may include routines, programs, objects, components, data structures, procedures, modules, functions, and the like that perform particular functions. The methods may also be practiced in a distributed computing environment where functions are performed by remote processing devices that are linked through a communications network. In a distributed computing environment, computer executable instructions may be located in both local and remote computer storage media, including memory storage devices.

Although systems and methods for providing voice activated information to a user via a wireless communications device have been described in language specific to certain features and methods, it is to be understood that the features defined in the appended claims are not necessarily limited to the specific features and methods described. Rather, the specific features and methods disclosed are illustrative forms of implementing the claimed subject matter.

What is claimed is:

1. A method of providing directions over a network to a mobile terminal, the method comprising:
   storing, in a memory, a plurality of destination entries;
   receiving, at a server a telephone call from the mobile terminal requesting direction information, a single voice-based request for directions to a target destination from the mobile terminal, the single voice-based request specifying the target destination and a delivery method for receiving the requested directions on the mobile terminal;
   converting the single-voice based request into a digital signal;
   determining a current location of the mobile terminal;
   comparing, by a processor, the plurality of destination entries with the target destination specified in the digital signal to determine a matching entry;
   obtaining directional instructions to the matching entry for the target destination based on the current location of the mobile terminal;
   determining the delivery method for the directional instructions specified in the digital signal of the single voice-based request; and
   transmitting, to the mobile terminal during the telephone call, the obtained directional instructions for display on the mobile terminal in accordance with the delivery method specified in the digital signal of the single voice-based request,
   wherein the delivery method specifies that the directional instructions include textual information and graphical direction on a map for display on the mobile terminal.

2. The method of claim 1, wherein the directional instructions include static information of the target destination.

3. The method of claim 2, wherein the static information include a name, an address, and a phone number of the target destination.

4. The method of claim 1, wherein the target destination is a category of destinations.

5. The method of claim 4, wherein the matching entry is a destination corresponding to the category of destinations.

6. The method of claim 5, wherein the matching entry is a destination closest to the current location of the mobile terminal.

7. The method of claim 4, wherein the matching entry is a list of destinations corresponding to the category of destinations.

8. The method of claim 7, wherein the list of destinations are ordered according to distance to the current location of the mobile terminal.

9. A system for providing directions to a mobile terminal over a network, comprising:
   a receiver that receives, a telephone call from the mobile terminal for requesting directional information, a single voice-based request for directions to a target destination, the single voice-based request specifying the target destination and a delivery method for receiving the requested directions on the mobile terminal;
   a memory that stores a plurality of destination entries;
   a locator to determine a current location of the mobile terminal;
   a processor that
      converts the single-voice based request into a digital signal;
      compares the plurality of destination entries with the target destination specified in the digital signal, determines a matching entry,
      obtains directional instructions to the matching entry for the target destination based on the current location of the mobile terminal,
      determines the delivery method for the directional instructions specified in the digital signal of the single voice-based request; and
   a transmitter that transmits, to the mobile terminal during the telephone call, the obtained directional instructions in accordance with the delivery method specified in the digital signal of the single voice-based request,
   wherein the delivery method specifies that the directional instructions include textual information and graphical direction on a map for display on the mobile terminal.

10. The system of claim 9, wherein the directional instructions include static information of the target destination.

11. The system of claim 9, wherein the target destination is a category of destinations.

12. The system of claim 11, wherein the matching entry is a destination corresponding to the category of destinations.

13. The system of claim 12, wherein the matching entry is a destination closest to the current location of the mobile terminal.

14. The system of claim 11, wherein the matching entry is a list of destinations corresponding to the category of destinations.

15. The system of claim 14, wherein the list of destinations are ordered according to distance to the current location of the mobile terminal.

16. A non-transitory computer-readable media comprising computer executable instructions that, when executed by a computer, performs a method comprising:
   storing, in a memory, a plurality of destination entries;
   receiving, at a server a telephone call from a mobile terminal for requesting directional information, a single voice-based request for directions to a target destination from the mobile terminal, the single voice-based request specifying the target destination and a delivery method for receiving the requested directions on the mobile terminal;
   converting the single-voice based request into a digital signal;
   determining a current location of the mobile terminal;
   comparing the plurality of destination entries with the target destination specified in the digital signal to determine a matching entry;
   obtaining directional instructions to the matching entry for the target destination based on the current location of the mobile terminal;

determining the delivery method for the directional instructions specified in the digital signal of the single voice-based request; and transmitting, to the mobile terminal during the telephone call, the obtained directional instructions for display on the mobile terminal in accordance with the delivery method specified in the digital signal of the single voice-based request, wherein the delivery method specifies that the directional instructions include textual information and graphical direction on a map for display on the mobile terminal.

17. The non-transitory computer-readable media of claim 16, wherein the directional instructions include static information of the target destination.

18. The non-transitory computer-readable media of claim 16, wherein the target destination is a category of destinations.

19. The non-transitory computer-readable media of claim 18, wherein the matching entry is a destination corresponding to the category of destinations.

20. The non-transitory computer-readable media of claim 19, wherein the matching entry is a destination closest to the current location of the mobile terminal.

* * * * *